United States Patent
Valero

(10) Patent No.: US 11,021,151 B2
(45) Date of Patent: Jun. 1, 2021

(54) CONTROL SYSTEM FOR A VEHICLE AND METHOD

(71) Applicant: JAGUAR LAND ROVER LIMITED, Warwickshire (GB)

(72) Inventor: Thomas Valero, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 90 days.

(21) Appl. No.: 16/310,963

(22) PCT Filed: Jun. 15, 2017

(86) PCT No.: PCT/EP2017/064700
§ 371 (c)(1),
(2) Date: Dec. 18, 2018

(87) PCT Pub. No.: WO2017/220429
PCT Pub. Date: Dec. 28, 2017

(65) Prior Publication Data
US 2020/0282993 A1 Sep. 10, 2020

(30) Foreign Application Priority Data
Jun. 21, 2016 (GB) .................................... 1610778

(51) Int. Cl.
*B60W 30/18* (2012.01)
*B60W 10/06* (2006.01)
(Continued)

(52) U.S. Cl.
CPC ...... *B60W 30/18018* (2013.01); *B60W 10/06* (2013.01); *B60W 10/08* (2013.01);
(Continued)

(58) Field of Classification Search
CPC ........... B60W 30/18018; B60W 10/10; B60W 10/06; B60W 10/08; F02N 11/0837;
(Continued)

(56) References Cited

U.S. PATENT DOCUMENTS

2012/0016573 A1  1/2012  Ellis
2012/0080001 A1  4/2012  Saito et al.
(Continued)

FOREIGN PATENT DOCUMENTS

EP  2799693 A1  11/2014
GB  2508670 A   6/2014
(Continued)

OTHER PUBLICATIONS

Combined Search and Examination Report under Sections 17 and 18(3) for Application No. GB1610778.1 dated Dec. 14, 2016.
(Continued)

*Primary Examiner* — Joseph J Dallo
(74) *Attorney, Agent, or Firm* — Carlson, Gaskey & Olds

(57) ABSTRACT

A motor vehicle stop/start control system (10) for controlling at least a portion of a powertrain of a vehicle, the system (10) being configured to: receive speed information (WSS) indicative of vehicle speed; and receive brake information (BPS) indicative that a braking system has been activated to apply brake torque; wherein the control system (10) is further configured to cause an engine (121) of the motor vehicle (100) to be switched off when a first set of predetermined conditions are met, the first set of conditions including the conditions that the brake information (BPS) indicates that the braking system is active and the speed information (WSS) indicates that vehicle speed is a below a predetermined engine-off speed, the engine-off speed being determined by the control system at least in part by reference to information received by the control system.

20 Claims, 5 Drawing Sheets

(51) Int. Cl.
*B60W 10/08* (2006.01)
*B60W 10/10* (2012.01)
*F02N 11/08* (2006.01)

(52) U.S. Cl.
CPC ......... *B60W 10/10* (2013.01); *F02N 11/0837* (2013.01); *F02N 2200/022* (2013.01); *F02N 2200/0801* (2013.01); *F02N 2200/123* (2013.01)

(58) Field of Classification Search
CPC ....... F02N 2200/123; F02N 2200/0801; F02N 2200/022
See application file for complete search history.

(56) References Cited

U.S. PATENT DOCUMENTS

2012/0179357 A1 7/2012 Phillips
2012/0209464 A1 8/2012 Falkenstein et al.

FOREIGN PATENT DOCUMENTS

JP 2000045807 A 2/2000
JP 2012046182 A 3/2012

OTHER PUBLICATIONS

International Search Report and Written Opinion of the International Searching Authority for International application No. PCT/EP2017/064700 dated Sep. 14, 2017.

CONTROL SYSTEM FOR A VEHICLE AND METHOD

TECHNICAL FIELD

The present disclosure relates to a vehicle controller and control method and particularly, but not exclusively, to a controller and a method for controlling operation of one or more vehicle systems or subsystems in a land-based vehicle. Aspects of the invention relate to a control system, a vehicle, a method, a non-transitory computer readable carrier medium carrying a computer readable code, a computer program product executable on a processor, a computer readable medium and a processor.

BACKGROUND

It is known to provide a control system for a motor vehicle for controlling one or more vehicle subsystems. A vehicle control system typically comprises a plurality of subsystem controllers including an engine controller (which may be described as an engine management system), a transmission controller and a brakes controller. In some vehicles, the control system may be configured to cause the engine automatically to be switched off in order to reduce emissions or save fuel when the vehicle stops. The control system may then cause the engine automatically to be switched back on when a driver depresses an accelerator pedal and/or releases a brake pedal. It is desirable to reduce vehicle emissions and/or fuel consumption as much as practically possible.

It is against this background that the present invention has been conceived. Embodiments of the invention may provide an apparatus, a method or a vehicle which addresses one or more of the above problems. Other aims and advantages of embodiments of the invention will become apparent from the following description, claims and drawings.

SUMMARY OF THE INVENTION

Aspects and embodiments of the invention provide control system, a vehicle, a method, a non-transitory computer readable carrier medium carrying a computer readable code, a computer program product executable on a processor, a computer readable medium and a processor as claimed in the appended claims.

In one aspect of the invention for which protection is sought there is provided a motor vehicle stop/start control system the system being configured to: receive speed information indicative of vehicle speed; receive brake information indicative that a braking system has been activated to apply brake torque; and receive gradient information indicative of driving surface gradient, wherein the control system is further configured to cause an engine of the motor vehicle to be switched off when a first set of predetermined conditions are met, the first set of conditions including the conditions that the brake information indicates that the braking system is active and the speed information indicates that vehicle speed is a below a predetermined engine-off speed.

While the gradient information may be indicative of the current pitch of the motor vehicle (that is, the gradient of the driving surface immediately beneath the vehicle), the gradient information may instead be indicative of the gradient of a road surface ahead of the vehicle. Such gradient information may be generated from one of a vehicle mounted sensor system and/or 3D map information.

The system may be installed in a motor vehicle having an automatic transmission. The vehicle may have a torque converter configured to substantially disconnect the driveline from the engine, for example when the accelerator pedal is released and the vehicle is coasting, in order to reduce emissions. The torque converter may be comprised by the automatic transmission. Alternatively the torque converter may be provided in a torque flowpath between the engine and automatic transmission.

The predetermined engine-off speed may be in the range from around 10 kph to around 30 kph. Advantageously the engine-off speed is not less than substantially 10 kph. Further advantageously the engine-off speed is not less than substantially 15 kph, optionally in the range from 15 kph to 40 kph, preferably in the range from 15 kph to 30 kph.

It is to be understood that in known vehicles having stop/start functionality, it is not known to provide stop/start functionality that is able automatically to stop the engine whilst the vehicle is moving, known as 'stop/start on the move'. This is because, in known vehicles with stop/start functionality and an automatic transmission, the driveline remains connected to the engine at substantially all times that the transmission is in a drive mode (such as forward drive mode D) and the engine is running. When the vehicle is travelling at speed and the driver releases the accelerator pedal, fuelling of the engine is typically stopped although the engine remains connected to the driveline which effectively 'drives' the engine, causing 'motoring' (turning) of the engine and causing the engine to exert a braking effect.

In contrast, in a vehicle having a torque converter configured to substantially disconnect the engine from the driveline, the torque converter typically substantially disconnects the engine from the driveline when the vehicle is travelling at speed and the accelerator pedal is released. When an engine controller of the vehicle detects that the engine speed falls below a predetermined value, engine fuelling resumes and the engine is prevented from stopping. A stop/start control system typically causes the engine to stop when vehicle speed falls below around 2-5 kph in order to reduce emissions. Thus, in vehicles having torque converters configured to substantially disconnect the engine from the driveline, the engine continues to burn fuel, and the vehicle generates unwanted emissions, even when the accelerator pedal is released and the engine is disconnected from the driveline, until vehicle speed falls to a value in the range from 2-5 kph.

Embodiments of the present invention have the advantage that a motor vehicle having a torque converter configured to substantially disconnect the engine from the driveline may experience a reduction in emissions when the vehicle slows. This is at least in part because the engine is caused to switch off when the vehicle is braking and vehicle speed falls below a predetermined speed.

In a further aspect of the invention for which protection is sought there is provided a motor vehicle stop/start control system for controlling at least a portion of a powertrain of a vehicle, the system being configured to:

receive speed information indicative of vehicle speed; and receive brake information indicative that a braking system has been activated to apply brake torque;

wherein the control system is further configured to cause an engine of the motor vehicle to be switched off when a first set of predetermined conditions are met, the first set of conditions including the conditions that the brake information indicates that the braking system is active and the speed information indicates that vehicle speed is a below a predetermined engine-off speed, the engine-off speed being determined by the control system at least in part by reference to information received by the control system.

Embodiments of the present invention have the advantage that, because the engine-off speed is determined at least in part by reference to information received by the control system, and is not substantially fixed for all situations or conditions, the engine-off speed can be adjusted dynamically in order to enhance vehicle operation, such as drivability and/or performance.

Optionally, the control system is configured to receive gradient information indicative of driving surface gradient, the engine-off speed being determined by the control system at least in part by reference to the gradient information.

Embodiments of the present invention have the advantage that, because the engine-off speed is determined at least in part by reference to gradient information, vehicle performance and handling may be enhanced when negotiating inclined driving surfaces. It is to be understood that if the vehicle is slowing and the control system causes the engine to be switched off, the control system may be configured to cause the engine to be restarted if the driver actuates an accelerator pedal or other control to increase the amount of drive demand, such as engine drive torque demand in the case of a conventional engine-driven motor vehicle having a single prime mover in the form or an engine.

The control system may be configured to not cause the engine to be switched off when the first set of predetermined conditions are met if the gradient information indicates the gradient exceeds a critical stop/start suspend value.

This feature has the advantage that, if the driving surface gradient is particularly steep, stop/start functionality may be suspended.

The control system may be configured to receive drive demand information indicative of an amount of drive demanded of the powertrain of the vehicle, wherein the first set of conditions further includes the condition that the drive demand information indicates that positive drive is not being demanded of the powertrain.

It is to be understood that in some embodiments drive demand information may be received from an accelerator control device, such as an accelerator pedal control, or from a speed control system.

Optionally, the drive demand information is generated at least in part in dependence on the position of a user-operated drive demand input control, wherein the control system is configured to determine that the drive demand information indicates that positive drive is not being demanded of the powertrain if the position of the user-operated drive demand input control corresponds to a predetermined position.

Optionally, the predetermined user-operated drive demand input control position corresponds to an input control-released position.

In the case that the user-operated drive demand input control comprises an accelerator pedal, the predetermined position may correspond to an accelerator pedal-released position.

Optionally, the first set of one or more conditions includes the condition that the control system has determined that a stationary vehicle lies in a path of the vehicle ahead of the vehicle.

Optionally, the first set of one or more conditions includes the condition that the control system has determined that a traffic control system lies in a path of the vehicle ahead of the vehicle and the traffic control system indicates that the vehicle must stop.

Optionally, the requirement that the first set of one or more conditions includes the condition that the control system has determined that a traffic control system lies in a path of the vehicle ahead of the vehicle and the traffic control system indicates that the vehicle must stop comprises the condition that the traffic control system is a traffic light control system and the traffic light control system indicates that the vehicle must stop.

The control system may be configured automatically to cause the foundation braking system to apply brake force to the one or more brake wheels to substantially prevent rollback of the vehicle if a second set of conditions are met, the second set of conditions comprising the conditions that the vehicle speed has fallen substantially to zero and the engine has been stopped automatically by the stop/start control system.

Optionally, the second set of conditions further comprises the condition that the gradient information indicates that the gradient of the driving surface exceeds a predetermined gradient amount.

In an aspect of the invention for which protection is sought there is provided a control system according to any preceding claim, comprising an electronic processor having an electrical input for receiving the brake information and speed information; and an electronic memory device electrically coupled to the electronic processor and having instructions stored therein,
  wherein the processor is configured to access the memory device and execute the instructions stored therein such that it is operable to cause an engine of the motor vehicle to be switched off when a first set of predetermined conditions are met, the first set of conditions including the conditions that the brake information indicates that the braking system is active and the speed information indicates that vehicle speed is a below a predetermined engine-off speed, the engine-off speed being determined by the processor at least in part by reference to information received by the processor.

In a further aspect of the invention for which protection is sought there is provided a vehicle comprising a motor vehicle stop/start control system according to another aspect.

Optionally, the powertrain comprises an engine and a driveline, the driveline comprising an automatic transmission, the vehicle further comprising a torque converter configured to cause disconnection of the engine from at least a portion of the automatic transmission.

Optionally, the torque converter is provided in a torque flowpath from the engine to the automatic transmission.

Optionally, the torque converter is comprised by the automatic transmission.

Optionally, the vehicle comprises an electric pump for changing gear while the engine is switched off.

In an aspect of the invention for which protection is sought there is provided a method of controlling a vehicle implemented by means of a control system, the method comprising:
  receiving speed information indicative of vehicle speed; and
  receiving brake information indicative that a braking system has been activated to apply brake torque;
  wherein the method comprises causing an engine of the motor vehicle to be switched off when a first set of predetermined conditions are met, the first set of conditions including the conditions that the brake information indicates that the braking system is active and the speed information indicates that vehicle speed is a below a predetermined engine-off speed, the engine-off speed being determined by the control system at least in part by reference to information received by the control system.

In an aspect of the invention for which protection is sought there is provided a non-transitory computer readable carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a computer readable medium loaded with the computer program product of another aspect.

In an aspect of the invention for which protection is sought there is provided a processor arranged to implement the method of another aspect, or the computer program product of another aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which.

DETAILED DESCRIPTION

Figure 1:
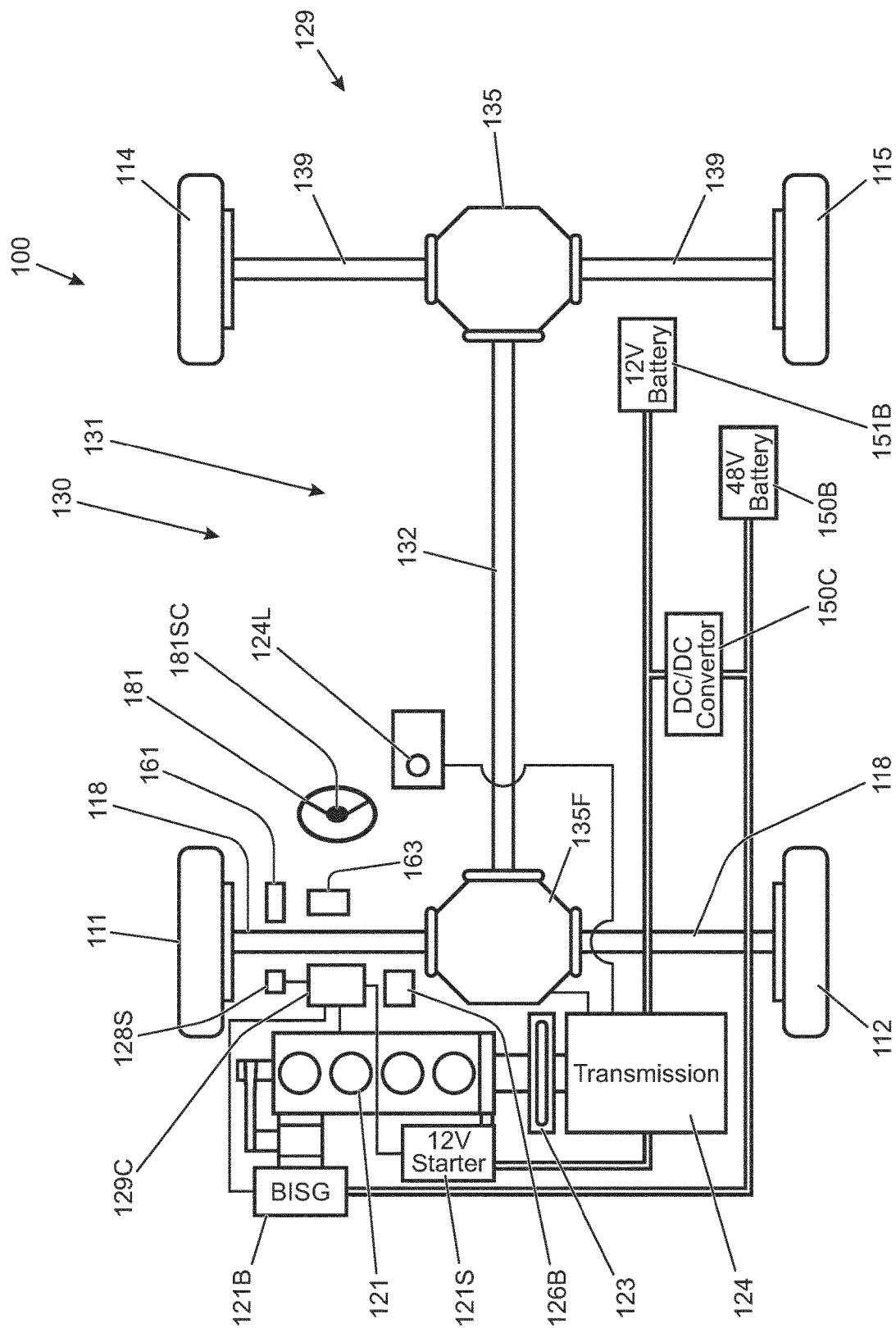
FIG. 1 is a schematic illustration of a vehicle according to an embodiment of the present invention.

FIG. 1 shows a vehicle 100 according to an embodiment of the invention. The vehicle 100 has a powertrain 129 that includes an engine 121 that is connected to a driveline 130 having an automatic transmission 124. The transmission 124 has a transmission mode selector dial 124L permitting a driver to select the required transmission operating mode selected from park (P), forward drive (D), neutral (N) and reverse drive (R). The automatic transmission 124 has an integrated torque converter that is configured to assume one of three conditions: a 'slipping' condition, a lock-up' condition, or a 'disconnect' condition.

In the slipping condition, slip of an input drive portion of the torque converter relative to an output portion thereof is permitted, for example when the engine 121 is on and the vehicle is at rest with the transmission in a forward or reverse operating mode. In the lock-up' condition the input drive portion and output drive portion of the torque converter are substantially locked together such that substantially no slip of one relative to the other occurs. Such a condition is advantageously assumed when the vehicle has accelerated from a rest condition and the speeds of the input and output portions of the torque converter are able to be matched. Assumption of the lock-up condition results in enhanced efficiency of operation of the transmission 124 since losses associated with slip of a torque-converter may be reduced. In the 'disconnect' condition, the input and output drive portions of the torque converter are substantially disconnected from one another.

A starter motor 121S and a belt-integrated starter/generator device (BISG) 121B are respectively coupled to the engine 121. The starter 121S is powered by a 12V battery 151B and is configured to start the engine 121 when required. The BISG is configured to provide torque boost to the engine 121 when required, reducing the amount of power that the engine 121 is required to generate in order to meet driver drive demand. Thus, the amount of torque required to meet driver drive demand may be provided by a combination of torque generated by the engine 121 and torque generated by the BISG 121B. The BISG 121B is powered by means of a 48V battery 150B. When the BISG 121B is not being operated as a motor to provide torque assist, the BISG 121B may be operated as a generator in order to generate electric current to recharge both the 48V battery 150B and the 12V battery 151B. The 12V battery 151B is recharged via a DC/DC converter 150C that converts a potential of around 48V generated by the BISG 121B to a potential suitable for recharging the 12V battery 151B.

The vehicle 100 has a powertrain controller 129C configured to control stopping and starting of the engine 121, and to control operation of the BISG 121B to provide torque boost or recharging of the battery 150B when required. It is to be understood that in some embodiments the BISG 121B may be used to start the engine 121 instead of the starter 121S in certain circumstances.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. It is to be understood that embodiments of the present invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles, or permanent four wheel drive vehicles. In the embodiment of FIG. 1 the transmission 124 is releasably connectable to the auxiliary driveline portion 131, allowing selectable two wheel drive or four wheel drive operation. It is to be understood that embodiments of the invention may be suitable for vehicles having more than four wheels or less than four wheels.

The vehicle 100 has an accelerator pedal 161, a brake pedal 163 and a steering wheel 181. The steering wheel 181 is supported by a steering column 181SC.

Figure 2:
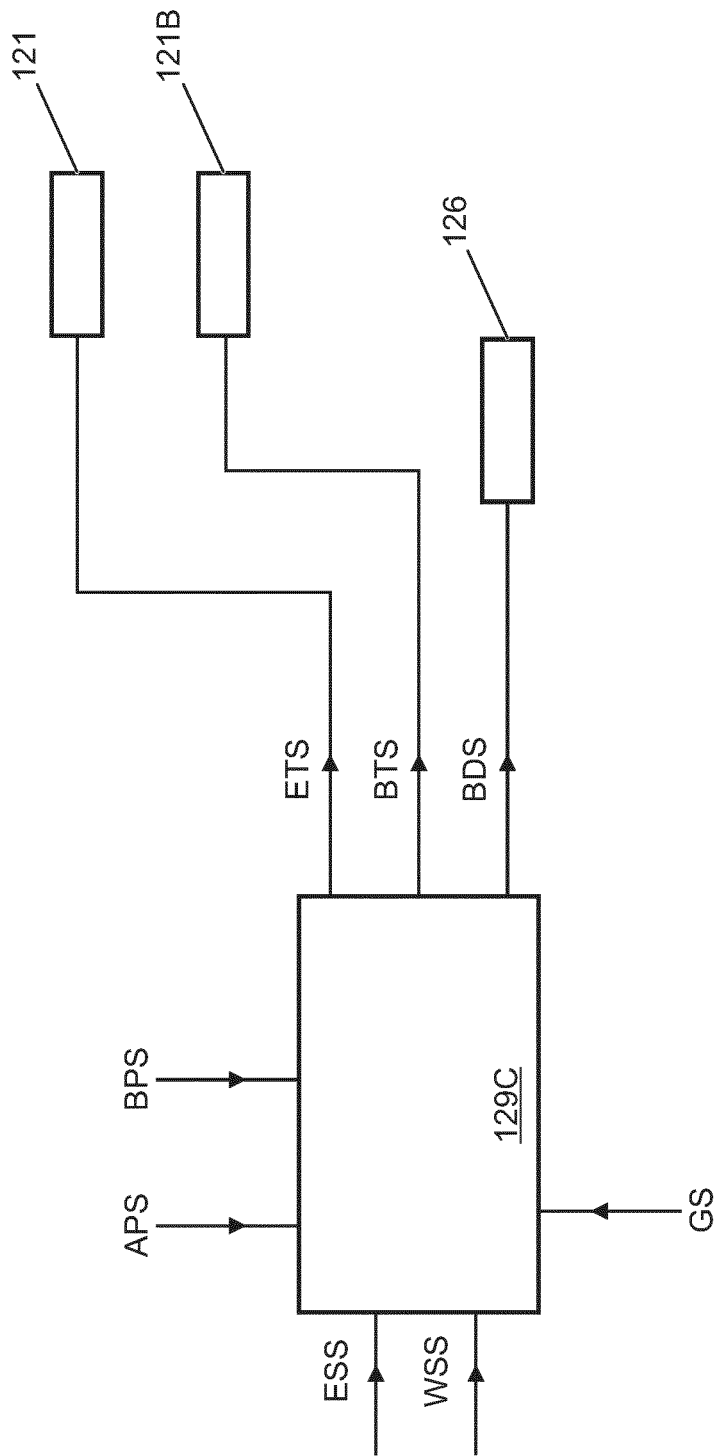
FIG. 2 is a block diagram illustrate a portion of a vehicle control system in accordance with an embodiment of the invention.

FIG. 2 illustrates schematically the powertrain controller 129C of the vehicle of the embodiment of FIG. 1. The powertrain controller 129C is configured to receive an accelerator pedal position signal APS indicative of the position of the accelerator pedal 161, a brake pedal position signal BPS indicative of the position of the brake pedal 163, an engine speed signal ESS indicative of the speed of rotation of the engine 121 and a wheel speed signal WSS from a sensor at each wheel indicative of the speed of rotation of each wheel 111, 112, 114, 115. The powertrain controller 129C also receives a driving surface gradient signal GS indicative of a gradient of the driving surface on which the vehicle 100 is located, from an inertial measurement unit (IMU) 128S. The gradient signal indicates the pitch angle of the vehicle 100 relative to a reference pitch angle which corresponds to the vehicle being positioned on a substantially flat, horizontal plane.

The powertrain controller 129C calculates a speed of travel of the vehicle 100 based on the wheel speed signals WSS, known as a vehicle reference speed VR. The controller 129C calculates the amount of powertrain torque demanded by the driver at any one time based on the accelerator pedal position signal APS and engine speed signal ESS, and controls the engine 121 and BISG 121B in order to cause the amount of driver demanded powertrain torque to be transmitted from the engine 121 and BISG 121B to the transmission 124. The powertrain controller 129C accomplishes this by outputting an engine torque request signal ETS to the engine 121 and a BISG torque request signal BTS to the BISG, in response to which the engine 121 and BISG 121B endeavour to generate the requested amount of torque.

The powertrain controller 129C is also configured to output a brake demand signal BDS to brake controller 126B, the brake demand signal BDS being indicative of the amount of brake pressure the brake controller 126B is to cause to be generated in the braking system 126 (FIG. 2).

In some alternative embodiments, a brake controller 126B receives the wheel speed signal WSS and calculates the value of VR, rather than the powertrain controller 129C, and the value of VR is output by the brake controller 126B to the powertrain controller 129C.

In the present embodiment, the powertrain controller 129C is configured to monitor the accelerator pedal position signal APS and brake pedal position signal BPS substantially continually. When the vehicle speed exceeds a predetermined lower threshold speed VLT but is less than a predetermined upper threshold speed VUT and the conditions are met that (1) the brake pedal position signal BPS indicates the brake pedal 163 is depressed by more than a predetermined amount, and (2) the accelerator pedal position signal APS indicates that the accelerator pedal 161 is in a released position, i.e. an undepressed position, the powertrain controller 129C is configured to cause an engine "stop on the move" (SOTM) procedure to be executed in which the engine 121 is switched off and, if the BISG 121B is delivering positive drive torque to the engine 121, the BISG 121B is caused not to deliver positive drive torque.

In embodiments of the present invention the predetermined lower threshold speed VLT is typically set to a nominal value, in the present embodiment a speed corresponding to the creep speed of the vehicle of substantially 5 kph although other values of VLT may be used. In the present embodiment the value of VUT is set in dependence on the gradient of the driving surface as indicated by gradient signal GS. The value of VUT is arranged to decrease with increasingly steep uphill gradient, until above a predetermined upper value of gradient signal GUS the value of VLT is set substantially to zero in order to prevent the engine 121 from switching off. In some embodiments, above a predetermined gradient value the engine 121 is not switched off automatically by the controller 129C even if the vehicle 100 comes to rest.

In the present embodiment the value of VUT is set to a value in the range from substantially 10 kph to substantially 17 kph depending on the gradient, the value of VUT decreasing from 17 kph to 10 kph as the gradient increases from substantially zero (corresponding to substantially level ground) to a gradient of substantially 25%. If the gradient exceeds 25% the powertrain controller 129C is configured not to cause the engine 100 to be switched off automatically.

In some embodiments the value of VUT may vary between different upper and lower limit values depending on the gradient. In some embodiments the value of VUT varies from a value of substantially 30 kph to a value of substantially 10 kph as the gradient steepens from substantially level ground to a gradient of substantially 25%.

In some embodiments the value of VUT may be substantially independent of the gradient.

It is to be understood that, in the event the driver releases the brake pedal 163 and depresses the accelerator pedal 161, whether the vehicle 100 is stationary or moving, the powertrain controller 129C causes the starter 121S to restart the engine 121 if the engine 121 has already been stopped in a SOTM procedure. Once the engine 121 is restarted the controller 129C causes the engine 121, optionally in combination with the BISG 121B, to generate an amount of drive torque corresponding to the amount demanded by the driver.

In the present embodiment, if a SOTM procedure is executed and the vehicle 100 comes to a stop on an uphill gradient for which the gradient signal indicates the gradient exceeds a predetermined value, the powertrain controller 129C automatically causes the brake controller 126B to establish or maintain a brake pressure of at least a predetermined amount in order to hold the vehicle 100 stationary and substantially prevent rollback. The predetermined amount is substantially fixed in the present embodiment although in some alternative embodiments the predetermined amount may be determined at least in part in dependence on the gradient signal.

In some embodiments, the powertrain controller 129C is configured to receive a torque converter status signal indicative of the state of the torque converter comprised by the automatic transmission 124. When the vehicle speed exceeds the predetermined lower threshold speed VLT but is less than the predetermined upper threshold speed VUT and the conditions are met that (1) the brake pedal position signal BPS indicates the brake pedal 163 is depressed by more than a predetermined amount, (2) the accelerator pedal position signal APS indicates that the accelerator pedal 161 is in a released position, i.e. an undepressed position, and (3) the torque converter status signal indicates that the torque converter is in the disconnect condition, the powertrain controller 129C is configured to cause the engine 121 to be switched off and the BISG 121B to not develop positive drive torque. If any of conditions (1) to (3) are not met, the controller 129C does not automatically cause the engine 121 to be switched off and the BISG 121B not to develop positive drive torque. The feature that a torque converter status signal is received by the powertrain controller 129C and employed to determine when to turn the engine 121 off has the advantage that the engine 121 may be turn off only when the torque converter has been confirmed to be in the disconnect condition, rather than assuming the torque converter will be in the disconnect condition if the accelerator pedal is release and the brake pedal depressed.

Embodiments of the present invention have the advantage that unwanted and non-useful fuel injection may be reduced without adversely affecting a vehicle's dynamics, at higher speeds than those employed in known vehicles employing engine stop/start technology. Thus, a driver's perception of a vehicle's response to driver inputs to the steering wheel 181, brake pedal 163 and accelerator pedal 161 may remain substantially the same whilst reducing emissions by turning off the engine 121 under certain predefined conditions. In some embodiments, an increase in fuel economy in the range 2-6% may be enjoyed and a reduction in emissions in the range 2-6%.

Figure 3:
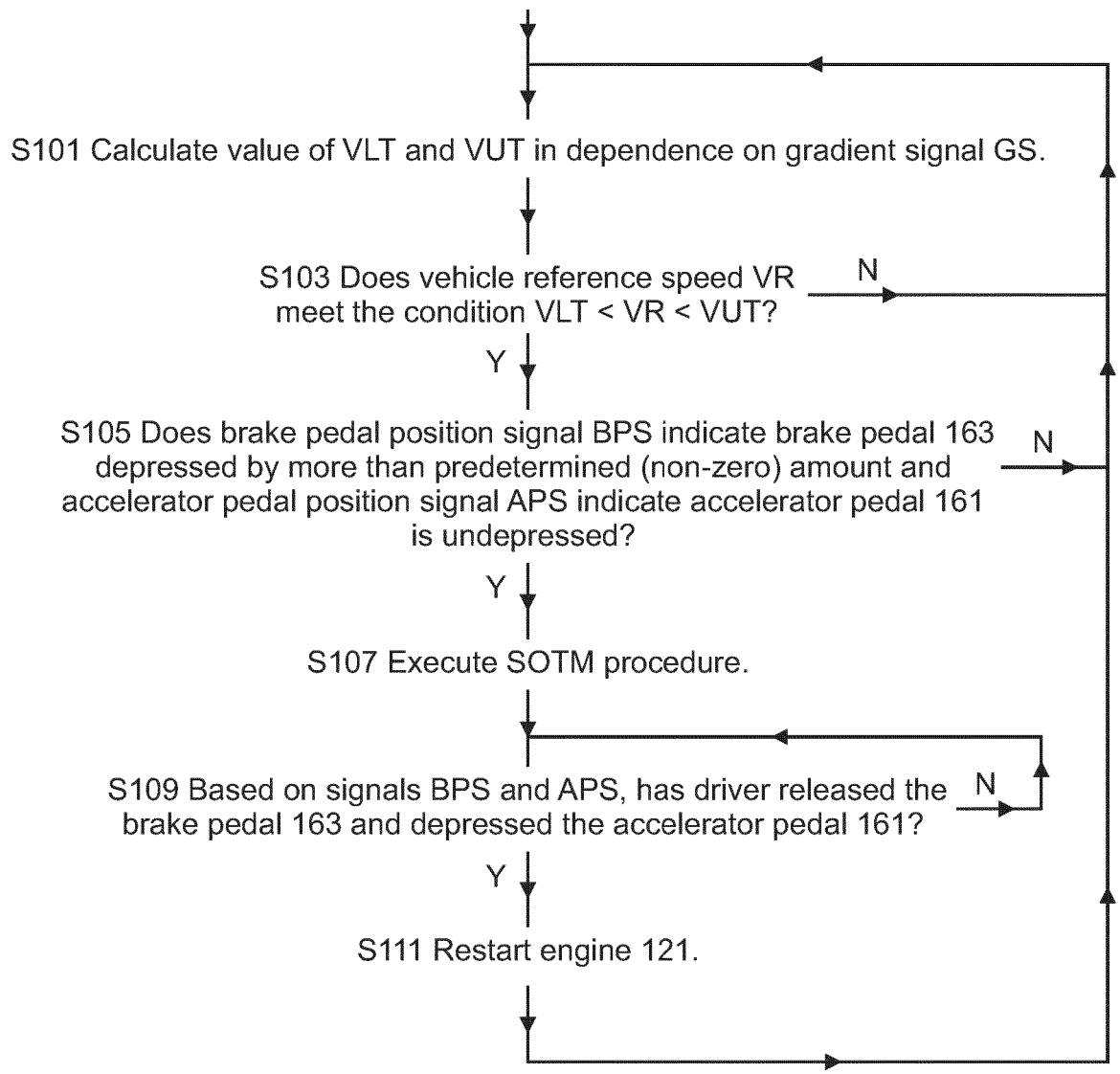
FIG. 3 is a flow diagram illustrating a method of controlling the vehicle of the embodiment of FIG. 1.

FIG. 3 is a flow diagram illustrating operation of the vehicle 100 of the embodiment of FIG. 1.

At step S101 powertrain controller 129C calculates a value of VLT and VUT in dependence on the gradient of the driving surface as indicated by gradient signal GS. The controller 129C then continues at step S103.

At step S103 the powertrain controller 129C determines whether vehicle reference speed VR meets the condition VLT<VR<VUT. If this condition is not met the controller 129C continues at step S101, else the controller 129C continues at step S105.

At step S105 the powertrain controller 129C determines whether brake pedal position signal BPS indicates that brake pedal 163 is depressed by more than a predetermined (non-zero) amount and accelerator pedal position signal APS indicates that accelerator pedal 161 is undepressed. If these conditions are met the controller 129C continues at step S107 else the controller continues at step S101.

At step S107 the controller 129C executes a SOTM procedure. The controller 129C then continues at step S109.

At step S109 the controller 129C determines whether, based on signals BPS and APS, the driver has released the brake pedal 163 and depressed the accelerator pedal 161. If this condition is met, the controller 129C continues at step S111 else the controller repeats step S109.

At step S111 the powertrain controller 129 causes the engine 121 to be restarted, and attempts to meet driver powertrain drive demand by means of the engine 121 and optionally the BISG 121B in addition, in the manner described earlier. The controller 129C then continues at step S101.

Figure 4:
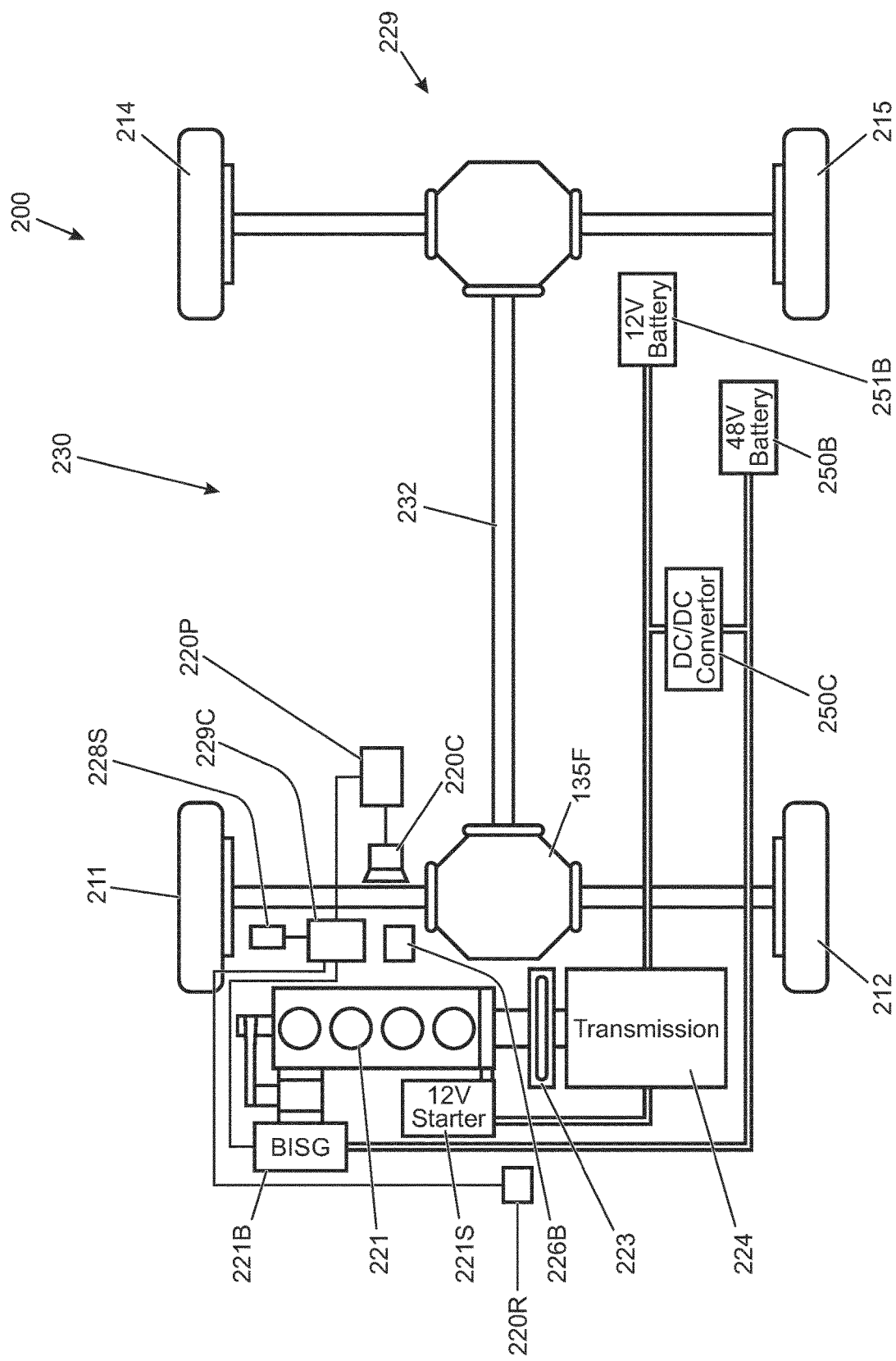
FIG. 4 is a schematic illustration of a vehicle according to a further embodiment of the present invention.

FIG. 4 shows a vehicle 200 according to a further embodiment of the present invention. Like features of the vehicle 200 of the embodiment of FIG. 4 to those of the vehicle 100 of the embodiment of FIG. 1 are shown with like reference signs incremented by 100.

The vehicle 200 of the embodiment of FIG. 4 has similar features to that of the embodiment of FIG. 1. In addition the vehicle 200 has a forward-looking video camera 220C configured to capture images of terrain and objects ahead of the vehicle 200. A stream of captured images in the form of image or frame data is transmitted from the camera 220C to an image processing module 220P.

The processing module 220P analyses the images received in order to identify the presence of traffic lights ahead of the vehicle 200 in the path of the vehicle 200. If the processing module 220P identifies the presence of traffic lights in the images, and determines that the traffic lights are in a state that allows traffic to continue moving, the processing module 220P outputs a 'SOTM suspend' signal to the powertrain controller 229C indicating that a SOTM procedure should not be carried out.

If the processing module 220P determines that the traffic lights are in a state that does not allow traffic to continue moving, the processing module 220P does not output the 'SOTM suspend' signal to the powertrain controller 229C. Accordingly, the powertrain controller 229C may cause a SOTM procedure to be carried out if the required conditions exist.

It is to be understood that, in some embodiments, the processing module 220P may be provided with information indicative of the geographical location of the vehicle 200 and information indicative of the geographical location of traffic lights. The processing module 200 may use this information in combination with captured image data to determine, based on the image data, the state of traffic lights that are known to exist according to the geographical location information. This may be particularly advantageous at locations where traffic lights may be present in the field of view of the camera 220C on a road parallel to that on which the vehicle 200 is driving, not being in the path of the vehicle 200. It may also be useful where other light sources or coloured objects may be visible not being traffic lights. The processing module 220P may ignore such lights or objects if the geographical location information does not indicate that a traffic light is expected to be present at that location.

The vehicle 200 also has a forward facing radar module 220R. The radar module 220R is configured to detect the presence of vehicles ahead of subject vehicle 200 and provides information to the powertrain controller 229C indicative of the relative location and speed of vehicles ahead of the subject vehicle 200. The information is used by the powertrain controller 229C in the implementation of an active cruise control (ACC) speed control system that adjusts vehicle speed to a speed below a user set-speed in the presence of slower moving traffic in a path of the vehicle 200.

In the present embodiment, the radar module 220R also outputs information indicative of the relative location and speed of vehicles ahead of the subject vehicle 200 to the processing module 220P. If the processing module determines that traffic is ahead of the vehicle 200 that is substantially stationary and in the path of the vehicle 200 the processing module 220P does not output the 'SOTM suspend' signal to the powertrain controller 229C.

Figure 5:
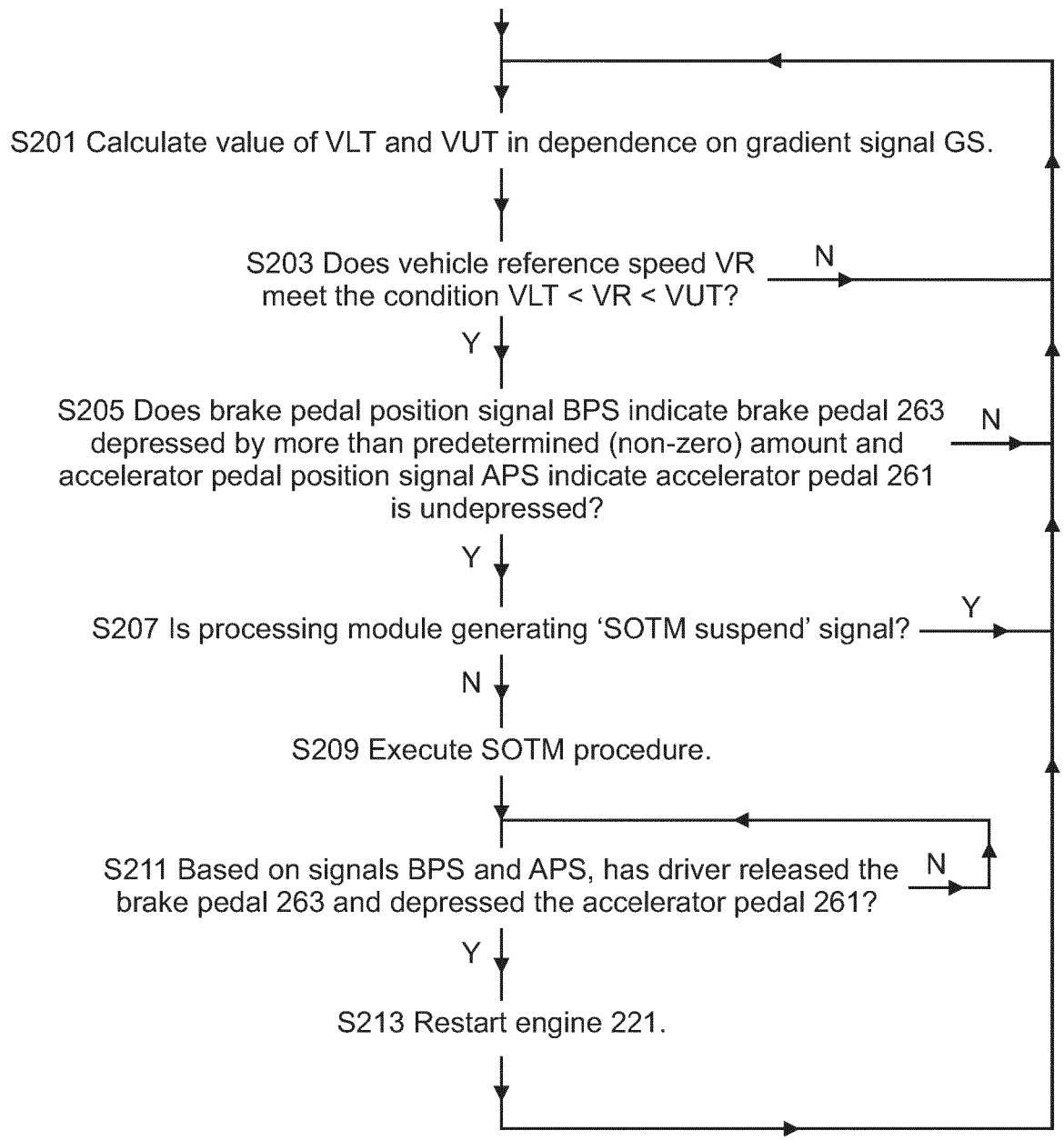
FIG. 5 is a flow diagram illustrating a method of controlling the vehicle of the embodiment of FIG. 4.

FIG. 5 is a flow diagram illustrating operation of the vehicle 200 of the embodiment of FIG. 4.

At step S201 powertrain controller 229C calculates a value of VLT and VUT in dependence on the gradient of the driving surface as indicated by gradient signal GS. The controller 229C then continues at step S203.

At step S203 the powertrain controller 229C determines whether vehicle reference speed VR meets the condition VLT<VR<VUT. If this condition is not met the controller 229C continues at step S201, else the controller 229C continues at step S205.

At step S205 the powertrain controller 229C determines whether brake pedal position signal BPS indicates that brake pedal 263 is depressed by more than a predetermined (non-zero) amount and accelerator pedal position signal APS indicates that accelerator pedal 261 is undepressed. If these conditions are met the controller 229C continues at step S207 else the controller continues at step S201.

At step S207 the controller 229C determines whether the processing module 220P is generating a 'SOTM suspend' signal. If the processing module 220P is generating such a signal the controller 229C continues at step S201 else the controller 229C continues at step S209.

At step S209 the controller 229C executes a SOTM procedure. The controller 229C then continues at step S211.

At step S211 the controller 229C determines whether, based on signals BPS and APS, the driver has released the brake pedal 263 and depressed the accelerator pedal 261. If this condition is met, the controller 229C continues at step S213 else the controller repeats step S211.

At step S213 the powertrain controller 229C causes the engine 221 to be restarted, and attempts to meet driver powertrain drive demand by means of the engine 221 and optionally the BISG 221B in addition, in the manner described earlier. The controller 229C then continues at step S201.

In some embodiments, the gradient of the driving surface ahead of the vehicle is used to set the VUT. The gradient of the driving surface ahead of the vehicle may be determined using vehicle-borne sensors such as stereoscopic cameras or radar system, or may be determined based on sufficiently accurate 3D map data combined with a known current position and driving path of the vehicle itself. Only a relatively short distance ahead of the vehicle needs to be considered, for example less than 300 metres ahead, and preferably between 10 m and 100 m ahead. In this way, the gradient which will be experienced either imminently (that is, the road surface immediately ahead of the vehicle) or within the next few seconds, can be used to avoid the situation that a decision is made with respect to gradient information which will not persist. The same principles and calculations as discussed above in relation to a current gradient (that is, based on the current pitch of the vehicle) can be applied instead to a gradient signal based on a gradient of the road surface ahead of the vehicle. Generally, the value of VUT is arranged to decrease with increasingly steep future uphill gradient. Potentially, the value of VUT could be arranged to decrease with increasingly steep downhill gradient.

The future gradient may be taken as a maximum gradient value within a look ahead distance, or may be an average gradient within the look ahead distance, or the average gradient over a predetermined portion of the look ahead distance.

It will be appreciated that the future gradient could be used instead of the current gradient, or more preferably in combination with the current gradient. For example, if the current gradient is downhill but the future gradient indicates that the gradient levels out to become almost flat or reverses to an limited uphill gradient within the look ahead distance, then a SOTM procedure may be initiated, in the knowledge that excess vehicle speed which builds up as the vehicle travels downhill will be offset by a future flat or limited uphill gradient.

In another example, if the vehicle is currently driving on a steep uphill gradient, but a shallower gradient, level gradient or downhill gradient are present shortly ahead of the vehicle, then a SOTM procedure may be initiated, in the knowledge that the current momentum of the vehicle will be sufficient to carry the vehicle beyond the current steep uphill gradient.

In some embodiments, the vehicle may be provided with an electric pump for driving a gear change of the vehicle. The electric pump can be powered by a power source such as a battery or an alternator. As will be explained below, this permits a SOTM procedure to be carried out using a higher VUT than is generally achievable without an electric pump. In particular, conventionally, gear changes utilise hydraulic power which is driven by the IC engine. Following a SOTM procedure, there may not be enough power for a gear change or only be sufficient hydraulic power for a single gear change, making it possible only to initiate the procedure at low speeds, and in particular in low gears. However, if an electric pump is provided to drive gear changes when the engine is off, then provided that sufficient electrical power is available, multiple gear changes can be provided when the IC engine is off. This enables a SOTM procedure to be initiated at higher speeds.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A motor vehicle stop/start control system for controlling at least a portion of a powertrain of a vehicle, the system comprising a controller configured to:
   receive speed information indicative of vehicle speed; and
   receive brake information indicative that a braking system has been activated to apply brake torque;
   cause an engine of the motor vehicle to be switched off when a first set of predetermined conditions are met, the first set of predetermined conditions including the brake information indicating that the braking system is active and the speed information indicating that the vehicle speed is below an engine-off speed; and
   receive gradient information indicative of a driving surface gradient, the engine-off speed being determined by the control system at least in part by reference to the gradient information, wherein the gradient information is indicative of a gradient of a road surface ahead of the motor vehicle.

2. The control system according to claim 1, wherein the controller is configured to not cause the engine to be switched off when the first set of predetermined conditions are met if the gradient information indicates the gradient exceeds a critical stop/start suspend value.

3. The control system according to claim 1, wherein the gradient information is generated from a vehicle mounted sensor system and/or 3D map information.

4. The control system according to claim 1, wherein the controller is configured to receive drive demand information indicative of an amount of drive demanded of the powertrain of the vehicle, wherein the first set of predetermined conditions further includes the drive demand information indicates that positive drive is not being demanded of the powertrain.

5. The control system according to claim 4, wherein the drive demand information is generated at least in part in dependence on a position of a user-operated drive demand input control, wherein the controller is configured to determine that the drive demand information indicates that positive drive is not being demanded of the powertrain if the position of the user-operated drive demand input control corresponds to a predetermined position.

6. The control system according to claim 5, wherein the predetermined position corresponds to an input control-released position.

7. The control system according to claim 1, wherein the first set of predetermined conditions includes the control system has determined that a stationary vehicle lies in a path of the vehicle ahead of the vehicle.

8. The control system according to claim 1, wherein the first set of predetermined conditions includes the control system has determined that a traffic control system lies in a path of the vehicle ahead of the vehicle and the traffic control system indicates that the vehicle must stop.

9. The control system according to claim 8, wherein the traffic control system is a traffic light control system and the traffic light control system indicates that the vehicle must stop.

10. The control system according to claim 1, wherein the controller is configured automatically to cause a foundation braking system to apply brake force to one or more wheels to substantially prevent rollback of the vehicle if a second set of conditions are met, the second set of conditions comprising the vehicle speed has fallen substantially to zero and the engine has been stopped automatically by the stop/start control system.

11. The control system according to claim 10, wherein the second set of conditions further comprises the gradient information indicates that the gradient of the driving surface exceeds a predetermined gradient amount.

12. The control system according to claim 1, wherein the controller comprises
an electronic processor having an electrical input for receiving the brake information and speed information; and
an electronic memory device electrically coupled to the electronic processor and having instructions stored therein,
wherein the electronic processor is configured to access the electronic memory device and execute the instructions stored therein such that the electronic processor is operable to cause the engine of the motor vehicle to be switched off when the first set of predetermined conditions are met, the first set of conditions including the brake information indicates that the braking system is active and the speed information indicates that vehicle speed is a below an engine-off speed, the engine-off speed being determined by the electronic processor at least in part by reference to information received by the processor.

13. A vehicle comprising the motor vehicle stop/start control system of claim 1.

14. The vehicle according to claim 13, including a powertrain comprising an engine and a driveline, the driveline comprising an automatic transmission, the vehicle further comprising a torque converter configured to cause disconnection of the engine from at least a portion of the automatic transmission.

15. The vehicle according to claim 14, wherein the torque converter is provided in a torque flowpath from the engine to the automatic transmission.

16. The vehicle according to claim 14, wherein the torque converter is comprised by the automatic transmission.

17. The vehicle according to claim 13, comprising an electric pump for changing gear while the engine is switched off.

18. A method of controlling a vehicle, the method being implemented by means of a control system, the method comprising:
receiving speed information indicative of vehicle speed;
receiving brake information indicative that a braking system has been activated to apply brake torque;
causing an engine of the vehicle to be switched off when a first set of predetermined conditions are met, the first set of predetermined conditions including the brake information indicates that the braking system is active and the speed information indicates that vehicle speed is a below an engine-off speed, the engine-off speed being determined; and
receiving gradient information indicative of a driving surface gradient, the engine-off speed being determined at least in part by reference to the gradient information, wherein the gradient information is indicative of a gradient of a road surface ahead of the vehicle.

19. A non-transitory computer readable carrier medium carrying computer readable code for controlling a vehicle to carry out the method of claim 18.

20. A processor configured to implement the method of claim 18.

* * * * *